United States Patent [19]
Matsushima et al.

[11] Patent Number: 4,818,856
[45] Date of Patent: Apr. 4, 1989

[54] OPTICAL INFORMATION READING APPARATUS

[75] Inventors: Takeshi Matsushima, Nagoya; Atsutoshi Okamoto, Chita; Hiromitsu Takai, Ohbu; Tadao Ohshima, Nagoya; Mutsushi Yamashita, Chiryu; Hiroshi Yamamoto, Anjo, all of Japan

[73] Assignee: Nippondenso Co., Ltd., Kariya, Japan

[21] Appl. No.: 926,519

[22] Filed: Nov. 4, 1986

[30] Foreign Application Priority Data

Nov. 6, 1985 [JP] Japan .................. 60-248650
Dec. 19, 1985 [JP] Japan .................. 60-286133

[51] Int. Cl.4 .............................................. G06K 7/10
[52] U.S. Cl. ..................................... 235/472; 235/462; 235/454
[58] Field of Search .............. 235/472, 462, 463, 467, 235/454, 455

[56] References Cited

U.S. PATENT DOCUMENTS 4,210,802  7/1980  Sakai ........................ 235/472
4,323,772  4/1982  Serge ........................ 235/463
4,335,302  6/1982  Robillard .................... 235/462
4,408,120 10/1983  Hara et al. .................. 235/462
4,488,678 12/1983  Hara et al. .................. 235/463
4,516,017  5/1985  Hara et al. .................. 235/472
4,528,444  7/1985  Hara et al. .................. 235/462
4,538,060  8/1985  Sakai et al. ................. 235/472
4,682,015  7/1987  Quan ......................... 235/472

FOREIGN PATENT DOCUMENTS 60-171581  9/1985  Japan .

OTHER PUBLICATIONS

"How to Select and Use Image Sensor", Daily Industrial Newspaper Co. of Japan, pp. 42-45 and 145; published Jan. 25, 1985.

Primary Examiner—A. D. Pellinen
Assistant Examiner—Leon K. Fuller
Attorney, Agent, or Firm—Cushman, Darby & Cushman

[57] ABSTRACT

Apparatus for reading optical information such as a bar code capable of reflecting ambient light and including a hand-held reader containing an image sensor. The hand-held reader is constructed so that ambient light illuminates the optical information, whereby an image of the optical information is imaged by ambient light reflected from the optical information on the image sensor so that the image is converted into an electric signal. The hand-held reader further includes a light detector for detecting intensity of the ambient light and the image sensor is controlled so that the exposure time thereof is changed in accordance with intensity of the ambient light detected by the light detector.

20 Claims, 6 Drawing Sheets

OPTICAL INFORMATION READING APPARATUS

BACKGROUND OF THE INVENTION

The present invention relates to optical information reading apparatus for reading optical information such as a bar code or characters printed on a record medium such as a label or the like.

As a conventional apparatus of this type, there is a Japanese patent application having a laid-open patent number 60-171581. This patent application discloses optical information reading apparatus comprising a red LED to illuminate a label on which an optical information such as a bar code or characters is printed so that an image of the optical information by light reflected therefrom is imaged on an image sensor thereby to convert the image into an electric signal by an electronic scanning operation.

However, since the red LED consumes about 80% of the electric current required for the whole apparatus, it provides too great of a drain to allow, a battery to be used to drive a red LED type reading apparatus.

As general background art, reference may be made to U.S. Pat. No. 4,408,120, 4,488,678, 4,516,017, 4,528,444 and 4,538,060 and the U.S. patent application of Hara et al Ser. Nos. 517,745 filed July 27, 1983 and 693,825 filed Jan. 23, 1985 and now abandoned.

SUMMARY OF THE INVENTION

According to the present invention, ambient light instead of internally generated light is used to illuminate the optical information to be read. The optical reader is of the hand held type having a head with a reading opening which is placed adjacently to the optical information to be read and the head is so constructed that ambient light reaches the optical information during the reading thereof.

Therefore, according to the present invention no artificial light source is needed to illuminate the optical information and hence the consumption of electric current becomes low.

Further, as an another aspect of the present invention, in addition to the above-described characteristics, regulating means is provided for changing the exposure time of the image sensor inversely relative to the intensity of the ambient light.

Therefore, the reading operation of the image sensor can be assured irrespective of the change of intensity of the ambient light.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawings, of which:

FIGS. 6(a) through 6(i) are timing charts useful for understanding the operation of the embodiment of FIG. 1 through FIG. 5;

DETAILED DESCRIPTION OF THE PREFERRED EMBODIMENTS

The present invention will now be described hereinunder with reference to the preferred embodiments thereof.

Figure 1:
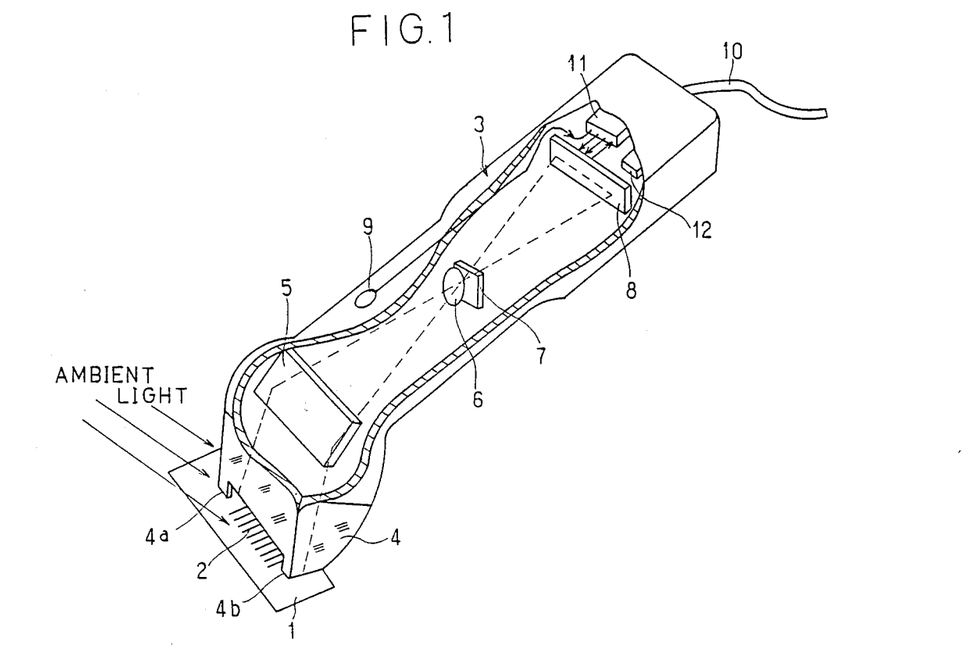
FIG. 1 is a partial sectional view showing a first embodiment of an optical information reading apparatus according to the present invention.
Figure 2:
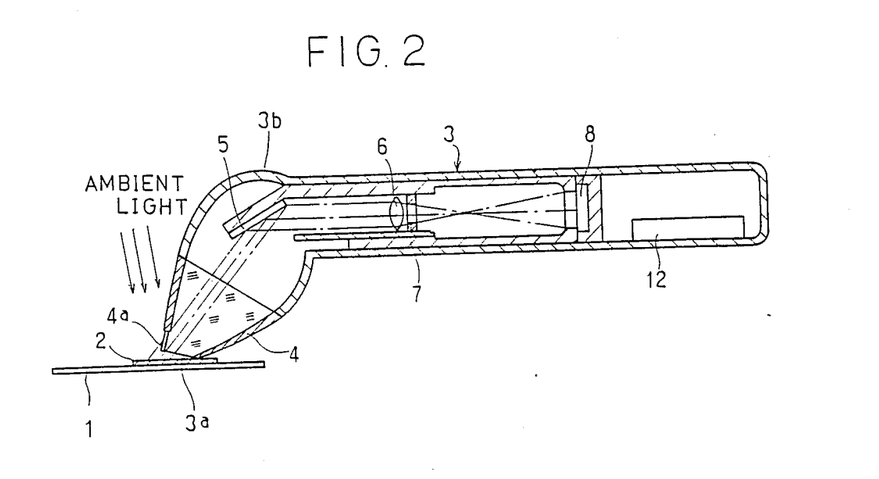
FIG. 2 is a side sectional view of the apparatus shown in FIG. 1.

FIGS. 1 and 2 refer to a hand-held reader which forms part of an optical information reading apparatus. In FIGS. 1 and 2, a bar code label 1 contains a bar code 2 having black bars and white bars which are all parallel to each other and which will reflect ambient light. A hand-held reader has a casing 3 with an opening 3a at (see FIG. 2) the reading end thereof. The opening passes ambient light out of and into casing 3 and is long and narrow relative to the parallel bars of bar code 2. Casing 3 also includes a rectangular elongated body portion made of non-transparent material extending to the head 3b of casing 3. Head 3b has an end portion made of transparent material for passing ambient light therethrough to illuminate bar code 2 via opening 3a. Some ambient light also reaches the bar code 2 directly since the head has short legs 4a and 4b on the front side which decrease to zero light on the rear side.

Reflecting mirror 5 reflects light reflected from bar code 2 in a predetermined direction, i.e., toward image sensor 8. The light reflected from mirror 5 is transmitted through lens 6 and diaphragm member 7 which has an elongated slit arranged so that its longitudinal direction is vertical in the drawing. From diaphragm member 7 the light goes on to image sensor 8 where an image of bar code 2 to be scanned is imaged thereon. Image sensor 8 uses a one-dimensional image sensor which converts the image on the scanning line into an electric signal by electronic scanning operation. On the outside of case 3 is a light detector 9 for detecting the intensity of ambient light outside of case 3. Image sensor 8 is controlled to change its exposure time in accordance with the intensity detected by light detector 9 as described in detail below. Signal cable 10 electrically connects between electric circuits in electronic control circuit 11 disposed in case 3 and a data processing unit (FIG. 3) disposed outside of case 3. Battery 12 disposed in case 3 supplies electric power to electric circuits in case 3.

Operation of the above-described embodiment is described next.

Casing 3 is positioned to read bar code label 1 as shown in FIG. 1 so that the opening 3a of casing 3 faces bar code 2. Ambient light on bar code 2 is reflected thereby through opening 3a illuminated by ambient light received externally and that which passes through transparent end portion 4. Since bar code 2 is printed in white and black bars which are contrasting colors in light reflectivity, the reflected light therefrom has corresponding light densities. The reflected light, passing via reflecting mirror 5, lens 6 and diaphragm member 7, is received by image sensor 8 on a scanning line thereof, whereby an image of bar code 2 is imaged on the scanning line where photoelements of image sensor 8 are in line. Image sensor 8 which is activated by electronic control circuit 11 converts the image into an electric signal by the electric scanning operation thereof.

As indicated above, a change of intensity of the ambient light on bar code 2 causes a problem to the scanning operation of image sensor 8. For example, when the hand-held reader is used in an ordinary office, the degree of light is about 1000 lumens, while near a window it is about 10–100 times as much as that in the ordinary office, but only about 200 lumens where light is not needed or available so much such as in a warehouse or the like. Therefore, image sensor 8 needs to be controlled so that the scanning operation thereof is properly performed even if the intensity of the ambient light changes. To do so, light detector 9 detects the intensity of the ambient light, and image sensor 8 is controlled in a manner explained below so that the exposure time thereof is changed in accordance with the intensity of the ambient light detected by light detector 9, whereby the electric charge of image sensor 8 is regulated.

Figure 3:
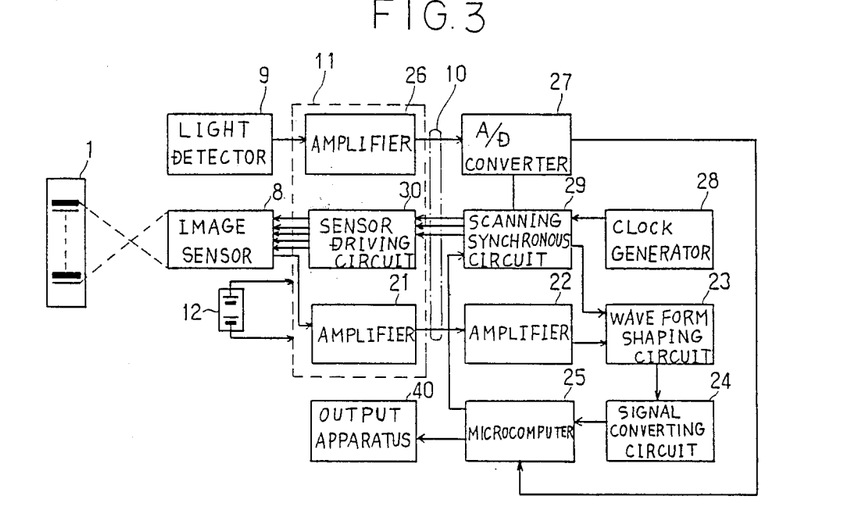
FIG. 3 is a circuit diagram showing the whole circuit for the apparatus shown in FIGS. 1 and 2.

The whole electric circuit diagram is shown in FIG. 3 in which amplifiers 21 and 22 amplify the electric signal obtained from image sensor 8 by scanning in a conventional manner. The waveform of the output signal from amplifier 22 is shaped by waveform shaping circuit 23 which includes a sample-and-hold circuit for sample-holding a peak value of the output signal from amplifier 22 and converting the output signal into a continuous signal. Signal converting circuit 24 converts the waveform shaped signal from waveform shaping circuit 23 into a binary signal having high and low levels respectively corresponding to the black and white bars. The binary signal is applied to microcomputer 25.

On the other hand, a signal representing ambient light detected by light detector 9 is amplified by amplifier 26, converted by A/D converter 27 into a digital signal L which increases when the ambient light decreases and vice-versa. Signal L is then applied to microcomputer 25.

Figure 4:
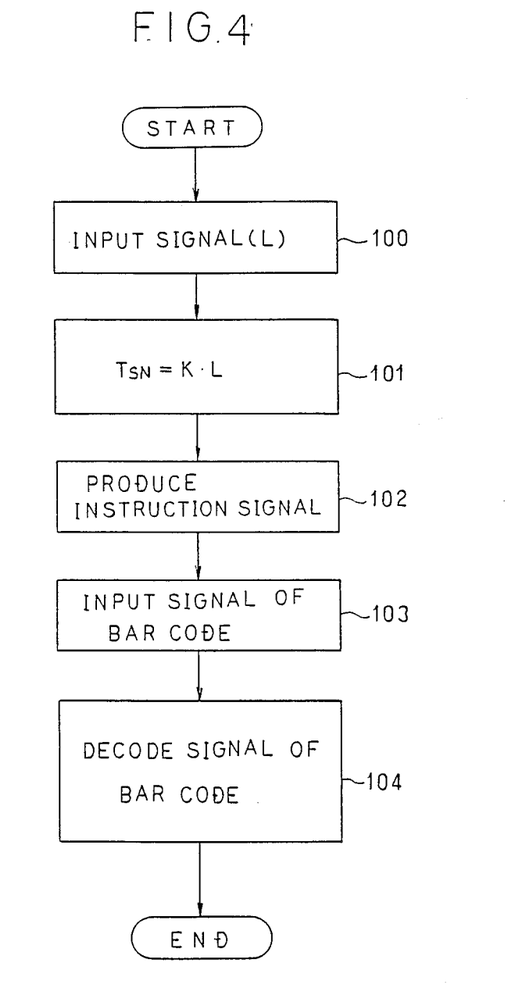
FIG. 4 is a flowchart showing the operation of a microcomputer of FIG. 3.

Microcomputer 25 performs operations in accordance with the flowchart of FIG. 4. Firstly, at step 100, the ambient light signal L from A/D converter 27 is input. At step 101, exposure time TSN is calculated with the following equation, wherein K is a constant.

$$TSN = K \times L$$

At the next step 102, an instruction signal to change the scanning cycle of image sensor 8 in an continuous inverse relationship according to the exposure time TSN is produced and delivered to a scanning synchronous circuit 29.

In step 103, a signal corresponding to the image of bar code 2 is input from signal converting circuit 24. The input signal is decoded in step 104 to read the content of bar code 2. According to this reading operation, a signal indicating the content of bar code 2 is produced to output apparatus 40 such as a data display apparatus.

The scanning synchronous circuit 29 of FIG. 3 is responsive to the instruction signals from microcomputer 25 to produce both scanning clock pulses and scanning synchronous signals for sensor driving circuit 30 and thence image sensor 8. The scanning synchronous signal determines the scanning cycle of image sensor 8. As a result, sensor driving circuit 30 responsive to the scanning clock pulses and the scanning synchronous signals from scanning synchronous circuit 29 controls image sensor 8 so that the scanning cycle of image sensor 8 becomes shorter when the ambient light is stronger, while the scanning cycle becomes longer when the ambient light is weaker, whereby the exposure time of image sensor 8 is regulated. Sensor 8 and driving circuit 30 may be constructed in accordance with U.S. Pat. No. 4,516,017, especially the left half of FIG. 9 thereof, starting with the inputs to J.K. flip-flops. Alternatively, and more preferably, the sensor 8 and driving circuit 30 are as described in "How to Select and Use Image Sensors" published Jan. 25, 1985 by the Daily Industrial Newspaper Co. of Japan; in particular, see pages 42–45 and 145 thereof.

Figure 5:
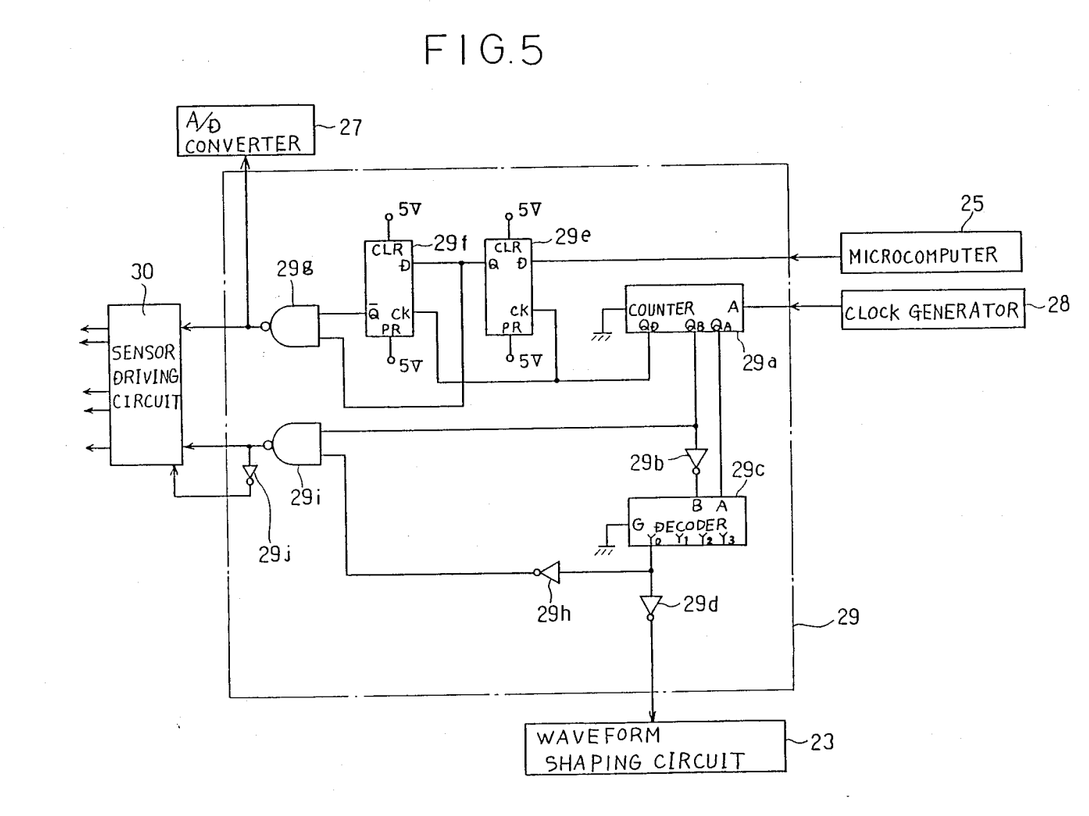
FIG. 5 is a circuit diagram detailing the scanning synchronous circuit of FIG. 3.
Figure 6A:
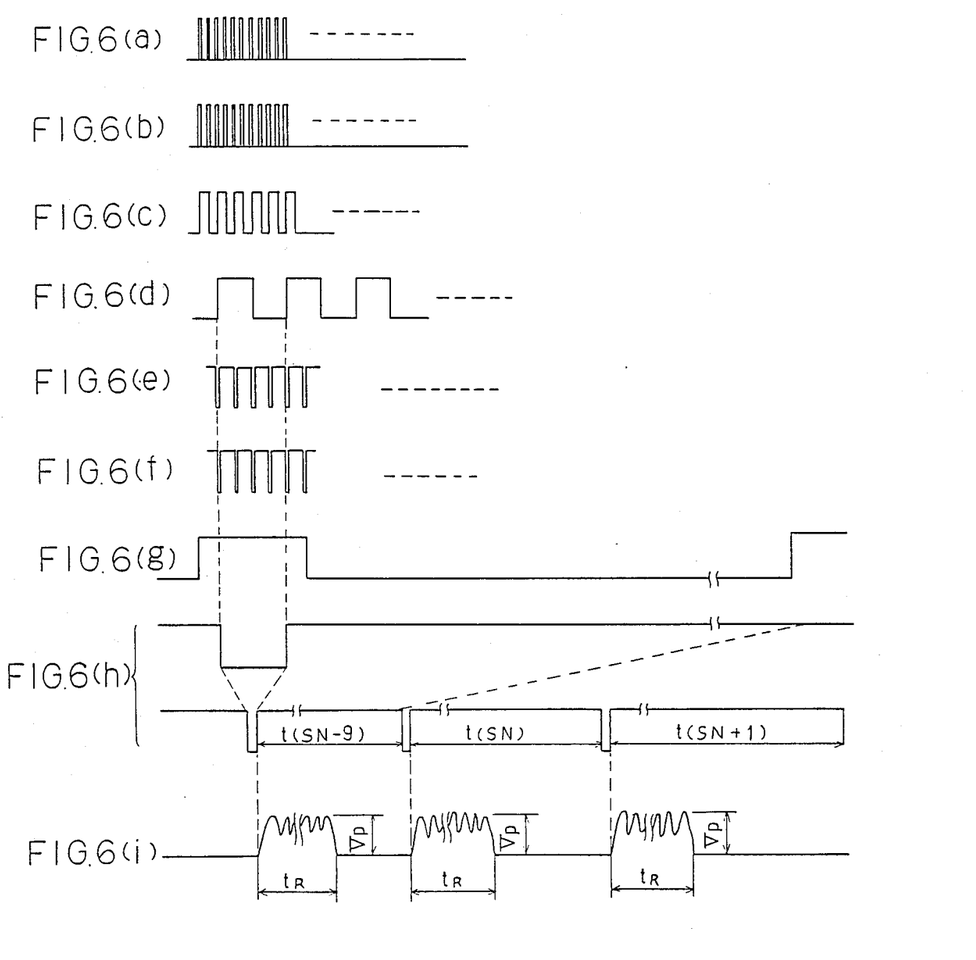

A detailed electric circuit diagram of scanning synchronous circuit 29 is shown in FIG. 5. Scanning synchronous circuit 29 includes a 4 bit counter 29a for counting the clock pulses shown in FIG. 6(a) received from clock generator 28, inverter 29b for inverting an output signal shown in FIG. 6(c) from the $Q_B$ terminal of counter 29a, decoder 29c for decoding an output signal from inverter 29b and an output signal as shown in FIG. 6(b) from the $Q_A$ terminal of counter 29a. Decoder 29c produces from its Yo terminal timing pulses as shown in FIG. 6(e) each time both input signals become "0" and inverters 29d and 29h invert the timing signals from the Yo terminal, D flip-flop circuits 29e and 29f input the instruction signal of FIG. 6(g) from microcomputer 25, NAND gate 29g inputs output signals from the Q terminal and the $\overline{Q}$ terminal of D flip-flop circuits 29e and 29f, respectively, and NAND gate 29i inputs output signals from inverter 29h and the $Q_B$ terminal of counter 29a. If the above mentioned circuit of U.S. Pat. No. 4,516,017 is used, then it is preferable to use inverter 29; as the lowermost input to circuit 9 of FIG. 9 in that patent.

According to the above-described structure, before microcomputer 25 produces an instruction signal, since the output signal from the Q terminal of flip-flop circuit 29e is low level and the output signal from the $\overline{Q}$ terminal of flip-flop circuit 29f is high level, NAND gate 29g produces a high level signal. Then, when microcomputer 25 produces an instruction signal and counter 29a produces a pulse signal shown in FIG. 6(d) from the $Q_D$ terminal thereof, the output signal from the Q terminal of flip-flop circuit 29e becomes high level, whereby NAND gate 29g produces a low level signal. Thereafter, when counter 29a produces the second pulse signal from the $Q_D$ terminal thereof, the output signal from the $\overline{Q}$ terminal of flip-flop circuit 29f becomes low level, whereby NAND gate 29g produces a high level signal. That is, when an instruction signal is produced by microcomputer 25, NAND gate 29g produces a scanning synchronous signal as shown in FIG. 6(h) (in which the second line is a contracted time version of the first line) having a low level at a timing that counter 29a counting clock pulses from clock generator 28 has produced two pulse signals as shown in FIG. 6(d) from the $Q_D$ terminal of counter 29a. On the other hand, NAND gate 29i produces the scanning clock pulses shown in FIG. 6(f) with the same cycle as output signals from the Yo terminal of decoder 29c. Sensor driving circuit 30 drives image sensor 8 by the scanning clock pulses at each cycle of the scanning synchronous signal. On the other hand, timing pulses having the same cycle as the scanning clock pulses are applied from inverter 29d to waveform shaping circuit 23 for performing its operations synchronously with the synchronous clock pulses.

The output of NAND gate 29g is also applied to A/D converter 27 as a timing pulse with its positive going edge causing the converter to output to microcomputer 25 a digital signal representing the current ambient light value.

When the ambient light is strong, the scanning cycle of image sensor 8 becomes shorter as shown in FIG. 6(h) for the first scanning cycle t(SN−1) and the electric signal from image sensor 8 is produced in the next scanning cycle t(SN) with an amplitude Vp in a scanning period tR as shown in FIG. 6(i).

As the ambient light gradually becomes weak, the scanning cycle gradually becomes longer as shown in FIG. 6(h) for cycles t(SN) and t(SN+1), whereby the exposure time of image sensor 8 gradually becomes longer so that the amplitude Vp of the electric signal of image sensor 8 remains substantially constant regardless of the weakness of the ambient light. Of course, when the ambient light brightens, the scanning cycle shortens, but $V_p$ remains the same. Thus, the reading operation of image sensor 8 can be assured irrespective of the change of intensity of the ambient light.

Figure 7:
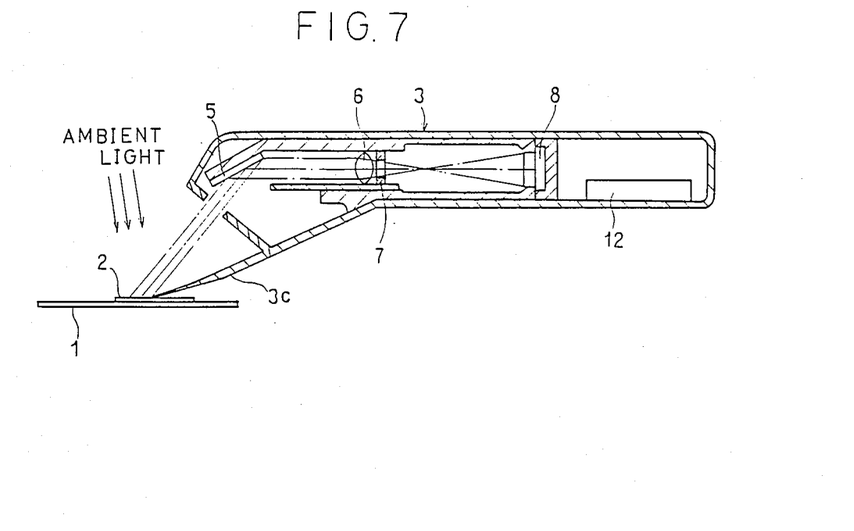
FIG. 7 is a side sectional view showing a second embodiment according to the present invention.

The second embodiment of the present invention is shown in FIG. 7. In this embodiment, instead of a transparent end portion 4 as in the first embodiment, only a lower underneath end portion 3c is employed, the upper part and sides too if desired of the head being one employed, for receiving the ambient light. Therefore, the ambient light directly illuminates bar code 2 through the open part.

Figure 8:
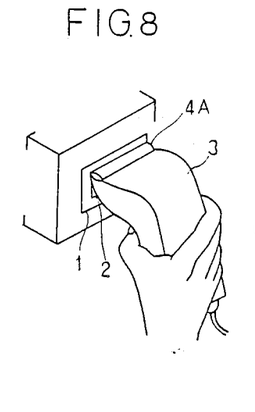
FIG. 8 is a schematic view showing a third embodiment according to the present invention.

In the third embodiment shown in FIG. 8 an elongated lens 4A is disposed at an end portion of casing 3 so that the ambient light is collected and illuminates bar code 2 therealong. Otherwise the head portion may be transparent or not as desired.

Figure 9:
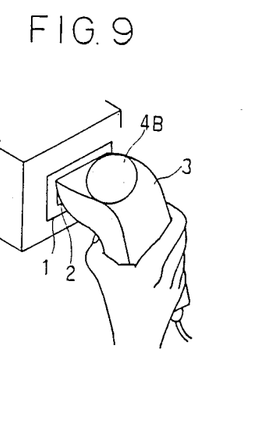
FIG. 9 is a schematic view showing a fourth embodiment according to the present invention.

The fourth embodiment in FIG. 9 has a round lens 4B provided at an upper side of the end portion of casing 3 so that the ambient light is collected and illuminates bar code 2. Again the head otherwise may be transparent or not as desired.

In the above-described embodiments, light detector 9 is used to detect the ambient light. However, as an alternative, the intensity of the ambient light may be determined by amplifying the electric signal of image sensor 8.

Further, although the optical information above described is in the form of a bar code 2 the optical information instead may be in the form of symbols or characters.

In addition, a two-dimensional image sensor may be used instead of the one-dimensional image sensor 8.

Further, instead of the scanning cycle of image sensor 8 being changed to change the exposure time of image sensor 8, an electrically driven optical shutter may be so disposed that its opening time is controlled to regulate the exposure time for sensor 8.

Of course, if the hand-held reader is used where the intensity of ambient light is kept constant, the structure to change the scanning cycle such as detector 9, amplifier 26, A/D converter 27, and scanning synchronous circuit 29 can be omitted.

Some exemplary embodiments of this invention have been described in detail above, but those skilled in the art will readily appreciate that many modifications are possible in the preferred embodiments without materially departing from the novel teachings and advantages of this invention. Accordingly, all such modifications are intended to be included within the scope of this invention as defined by the following claims.

What is claimed is:

1. Apparatus for reading optical information which reflects ambient light, comprising:

a casing having hand-holding portion made of non-transparent material, and a head portion having an opening at one end thereof for facing said optical information;

said head portion being constructed to allow illumination of said optical information by ambient light when said opening faces the optical information for a reading thereof;

optical means, disposed in said casing, for forming an image at a predetermined reading position in said casing, said image being formed of said optical information by ambient light reflected from said optical information when said opening faces said optical information;

an image sensor, disposed at said predetermined reading position for converting said ambient light image of said optical information into an electric signal; and means for regulating an exposure time of said image sensor in accordance with an intensity of said ambient light to allow said image sensor to operate over a large range of said ambient light.

2. Apparatus according to claim 1, wherein said head portion includes transparent means disposed adjacently to said opening for passing ambient light into said head portion and via said opening onto said optical information.

3. Apparatus according to claim 1, wherein said head portion includes a lens means for passing said ambient light onto said optical information.

4. Apparatus according to claim 3, wherein said lens means comprises a long lens disposed transversely of said casing adjacently to said opening.

5. Apparatus according to claim 3, wherein said lens means comprises a round lens disposed adjacently to said opening.

6. Apparatus according to claim 1, wherein said head portion has partially open part which includes said opening passing ambient light directly onto said optical information.

7. Apparatus according to claim 1, wherein said regulating means comprises a light detector for detecting the said intensity of said ambient light and producing an ambient light signal, and means responsive to said ambient light signal for increasing said exposure time of said image sensor when the intensity of said ambient light decreases.

8. Apparatus according to claim 1, wherein said regulating means comprises means for increasing a scanning cycle of said image sensor when the intensity of said ambient light decreases.

9. Apparatus for reading optical information in the form of a bar code having parallel bars which reflect ambient light, comprising:

a casing having a head portion with an elongated opening at one end for facing said bar code, and a body portion made of non-transparent material elongating toward the other end;

said head portion being constructed to allow illumination of said bars by ambient light when said opening faces the bar code for a reading thereof, and said head portion including transparent means disposed adjacent to said opening for passing said ambient light therethrough onto said bar code;

a reflecting mirror disposed in said casing for reflecting ambient light reflected from said bar code toward said other end;

lens means disposed in said case for collecting ambient light reflected by said reflecting mirror and imaging at a predetermined reading position an image of said bar code; and means at said predetermined reading position for converting said ambient light image of said bar code into an electric signal.

10. Apparatus according to claim 9, wherein said converting means comprises an image sensor for converting said ambient light image of said bard code into said electric signal, and means for driving said image sensor to perform electronic scanning of said electric signal.

11. Apparatus according to claim 10, further comprising means for regulating an exposure time of said image sensor in accordance with an intensity of said ambient light.

12. Apparatus according to claim 11, wherein said regulating means comprises at light detector for detecting the said intensity of said ambient light and producing an ambient light signal, and means responsive to said detecting signal for increasing and decreasing said exposure time of said image sensor in accordance with decreases and increases, respectively, of the intensity of said ambient light.

13. Apparatus according to claim 10, wherein said regulating means comprises means for increasing a scanning cycle of said image sensor when the intensity of said ambient light decreases.

14. Apparatus for reading optical information in the form of a bar code having parallel bars which reflect ambient light, comprising:

a casing having a head portion with an elongated opening at one end for facing said bar code and a body portion made of non-transparent material elongating toward the other end;

said head portion being constructed to allow illumination of said bars by ambient light when said opening faces the bar code for a reading thereof, and said head portion including first lens means for passing and collecting said ambient light onto said bar code;

a reflecting mirror disposed in said casing for reflecting ambient light reflected from said bar code toward other end;

second lens means disposed in said case for collecting ambient light reflected by said reflecting mirror and imaging at a predetermined reading position an image of said bar code; and means at said predetermined reading position for converting said ambient light image of said bar code into an electric signal.

15. Apparatus according to claim 14, wherein said first lens means comprises a long lens disposed transversely of said casing adjacently to said opening.

16. Apparatus according to claim 14, wherein said first lens means comprises a round lens disposed adjacently to said opening.

17. Apparatus according to claim 14, wherein said converting means comprises an image sensor for converting said ambient light image of said bar code into said electric signal, and means for driving said image sensor to perform an electronic scanning of said electric signal.

18. Apparatus according to claim 17, further comprising means for regulating an exposure time of said image sensor in accordance with an intensity of said ambient light.

19. Apparatus according to claim 18, wherein said regulating means comprises a light detector for detecting said intensity of said ambient light and producing an ambient light signal and means to said responsive to said detecting signal for increasing and decreasing said exposure time of said image sensor in accordance with decreases and increases respectively, of intensity of said ambient light.

20. Apparatus according to claim 17, wherein said regulating means comprises means for increasing a scanning cycle of said image sensor when the intensity of said ambient light decreases.

* * * * *